United States Patent
Negoro et al.

(10) Patent No.: US 7,902,791 B2
(45) Date of Patent: Mar. 8, 2011

(54) CONTROLLER FOR VARIABLE SPEED ALTERNATING CURRENT MOTOR

(75) Inventors: Hideto Negoro, Tokyo (JP); Satoru Sone, Chiba (JP)

(73) Assignee: Mitsubishi Electric Corporation, Chiyoda-Ku, Tokyo (JP)

(*) Notice: Subject to any disclaimer, the term of this patent is extended or adjusted under 35 U.S.C. 154(b) by 0 days.

(21) Appl. No.: 11/722,651

(22) PCT Filed: May 26, 2005

(86) PCT No.: PCT/JP2005/009686
§ 371 (c)(1),
(2), (4) Date: Jun. 22, 2007

(87) PCT Pub. No.: WO2006/126272
PCT Pub. Date: Nov. 30, 2006

(65) Prior Publication Data
US 2008/0122393 A1 May 29, 2008

(51) Int. Cl.
*H02P 3/18* (2006.01)
(52) U.S. Cl. ........... 318/812; 318/768; 318/105; 363/71; 363/65
(58) Field of Classification Search ........... 318/812, 318/768, 105; 363/71, 65
See application file for complete search history.

(56) References Cited

U.S. PATENT DOCUMENTS

| 5,031,088 A | * | 7/1991 | Tanaka ............................. 363/71 |
| 6,058,032 A | * | 5/2000 | Yamanaka et al. .............. 363/71 |
| 2006/0164028 A1 | * | 7/2006 | Welchko et al. .............. 318/105 |

FOREIGN PATENT DOCUMENTS

| JP | 04-087572 A | 3/1992 |
| JP | 04-208098 A | 7/1992 |
| JP | 07135797 A | 5/1995 |
| JP | 10-066372 A | 3/1998 |
| JP | 2000-354304 A | 12/2000 |
| JP | 2002-291103 A | 10/2002 |
| JP | 2002-369308 A | 12/2002 |
| JP | 2004-120968 A | 4/2004 |

OTHER PUBLICATIONS

Korean Office Action in corresponding Application No. 10-2007-7017152 dated Feb. 2, 2009.
International Search Report.

* cited by examiner

*Primary Examiner* — Bentsu Ro
*Assistant Examiner* — Erick Glass
(74) *Attorney, Agent, or Firm* — Buchanan Ingersoll & Rooney PC

(57) ABSTRACT

A controller for operating a variable speed alternating current motor using inverters to which power is supplied from two or more power supplies including an energy accumulator has a first inverter for converting direct current supplied from the outside into alternating current, a power supply for accumulating direct current, a second inverter for converting direct current supplied from the power supply into alternating current, and an adder for adding the alternating current voltages outputted from the first and second inverters.

6 Claims, 4 Drawing Sheets

CONTROLLER FOR VARIABLE SPEED ALTERNATING CURRENT MOTOR

TECHNICAL FIELD

The present invention relates to a controller for driving an alternating current motor, which is used in an electric vehicle such as a railroad vehicle and an electric automobile, for example.

BACKGROUND ART

As a technology for efficiently utilizing regenerative energy supplied from an alternating current motor to inverters, a current division controller which extracts regenerative energy inconvertible into power supply from all regenerative energy and accumulates the extracted regenerative energy in other power supply has been proposed. At the time of powering, power is supplied from the other power supply (for example, see Patent Reference No. 1).
Patent Reference No. 1: JP-A-2002-291103 (pp. 7, FIG. 1)

DISCLOSURE OF THE INVENTION

Problems that the Invention is to Solve

According to the known current division controller, in case of an alternating current motor connected with inverters, alternating current from a slave inverter and alternating current from a master inverter are added and supplied to the alternating current motor. In this case, torque generated by the alternating current motor is limited by the current upper limit of the alternating current motor.

Thus, particularly at the time of braking in a high-speed range, the increased torque of the alternating current motor is limited by its current upper limit, resulting in insufficient deceleration of the motor. Thus, this insufficient deceleration needs to be supplemented by a mechanical brake or the like so that constant deceleration can be secured throughout the entire operation speed range including the high-speed range.

The invention has been developed to solve the above problems. It is an object of the invention to provide a controller for a variable speed alternating current motor which enhances acceleration and deceleration in a high-speed range by increasing voltage applied to the alternating current motor.

Means for Solving the Problems

A controller for a variable speed alternating current motor according to the invention includes: two or more direct current power supplies including an energy accumulator; two or more inverters for converting direct current voltages supplied from the two or more direct current power supplies into alternating current voltages; and a voltage adder for adding output voltages from the two or more inverters.

Advantage of the Invention

According to the invention, acceleration and deceleration in a high-speed range can be enhanced without using supplementary means such as a mechanical brake.

Figure 1:
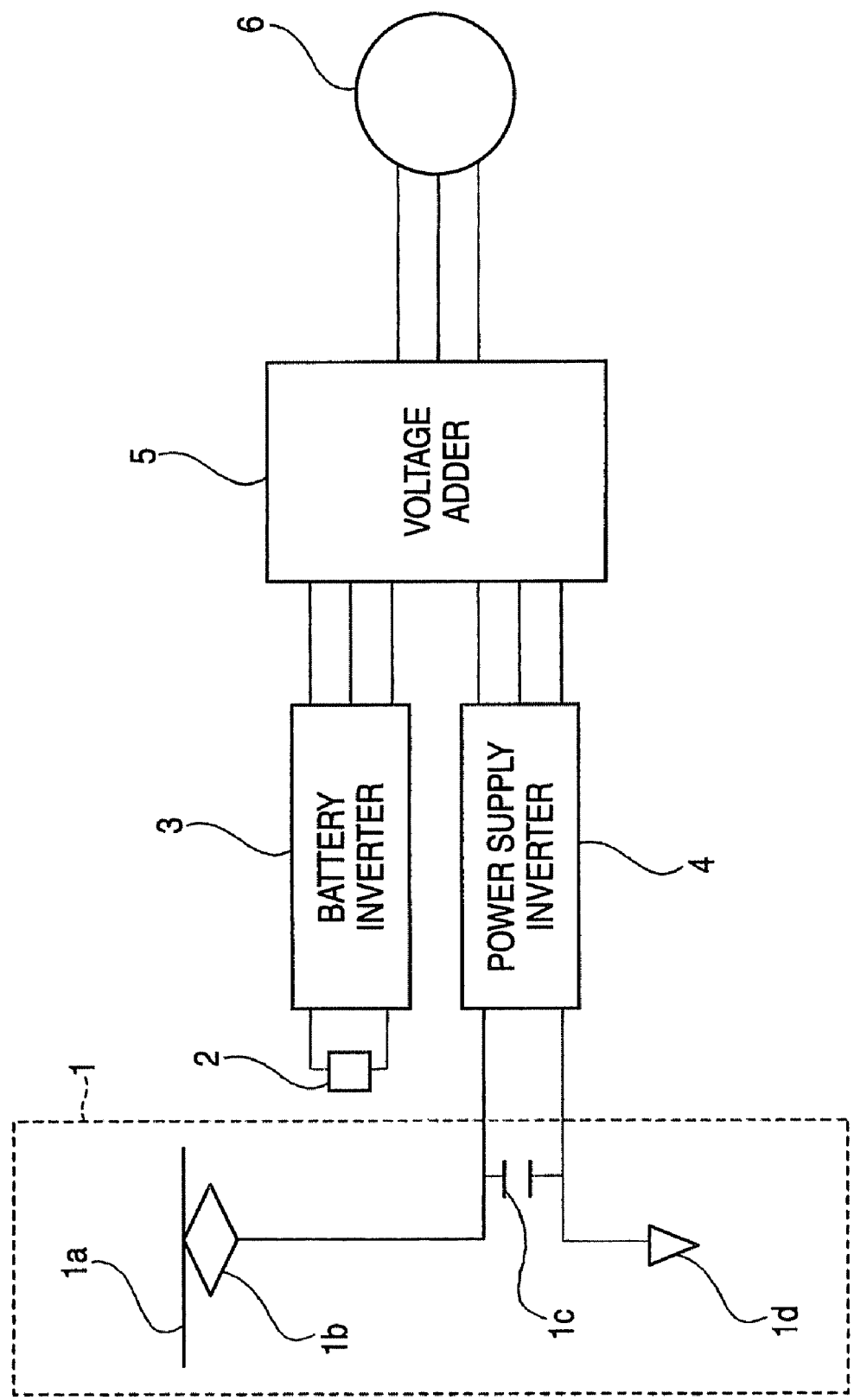
FIG. 1 illustrates a structure of a controller for a variable speed alternating current motor in a first embodiment according to the invention.

DESCRIPTION OF REFERENCE NUMERALS AND SIGNS 1 external power supply
1a line
1b pantograph
1c filter capacitor
1d ground voltage
2 energy accumulator
3 battery inverter
4 power supply inverter
5 voltage adder
6 alternating current motor
7a through 7c single phase inverter
8a through 8c energy accumulator for single phase inverter
9a, 9b select switch
10 filter capacitor

BEST MODE FOR CARRYING OUT THE INVENTION

First Embodiment

Embodiments according to the invention are hereinafter described in detail with reference to the drawings.

FIG. 1 illustrates a structure of a controller for a variable speed alternating current motor in a first embodiment according to the invention, showing an example of the controller used in a railroad vehicle or the like. As illustrated in FIG. 1, an external power supply 1 is connected with a power supply inverter 4 via a line 1a, a pantograph 1b, and a filter capacitor 1c. A ground voltage 1d is also provided.

An energy accumulator 2 consisted by a secondary battery, an electrical double layer capacitor or others is connected with a battery inverter 3. The battery inverter 3 and a power supply inverter 4 are power converters for converting DC power into AC power, or converting AC power into DC power. The battery inverter 3 and the power supply inverter 4 are controlled by PWM (pulse width modulation) control system, for example.

The battery inverter 3 and the power supply inverter 4 are connected with a voltage adder 5, and the voltage adder 5 is connected with an alternating current motor 6. The voltage adder 5 is consisted by a transformer, for example. When alternating current voltage from the battery inverter 3 and alternating current voltage from the power supply inverter 4 are added, a three winding transformer is used for each of U-phase, V-phase and W-phase.

The operation is now described. Initially, DC power is supplied from the external power 1 to the power supply inverter 4. In case of railroad vehicle, DC power from a substation (not shown) flowing in the line 1a is collected by the pantograph 1b, and then is supplied to the power supply inverter 4 via the filter capacitor 1c.

Subsequently, the battery inverter 3 converts DC power supplied from the energy accumulator 2 into AC power and outputs the converted power to the voltage adder 5. When the alternating current voltages from the battery inverter 3 are Vub, Vvb and Vwb, the alternating current voltages Vub, Vvb and Vwb are expressed by the following equations (1) through (3).

[Equation 1]

$$Vub = Vb \times \sin\theta b \quad (1)$$

[Equation 2]

$$Vvb = Vb \times \sin\left(\theta b - \frac{2}{3}\pi\right) \quad (2)$$

[Equation 3]

$$Vwb = Vb \times \sin\left(\theta b - \frac{4}{3}\pi\right) \quad (3)$$

In the above equations, Vb is the alternating current voltage peak value of the battery inverter 3, and θb is the phase of the battery inverter 3. Since the battery inverter 3 determines the level and frequency (phase) of the alternating current voltage within the range of direct current voltage by the PWM control, Vb and θb in the equations (1) through (3) can be arbitrarily controlled.

The power supply inverter 4 converts inputted DC power into AC power, and outputs the converted power to the voltage adder 5. When the alternating current voltages from the power supply inverter 4 are Vus, Vvs and Vws, the Alternating current voltages Vus, Vvs and Vws are expressed by the following equations (4) through (6).

[Equation 4]

$$Vus = Vs \times \sin\theta s \quad (4)$$

[Equation 5]

$$Vvs = Vs \times \sin\left(\theta s - \frac{2}{3}\pi\right) \quad (5)$$

[Equation 6]

$$Vws = Vs \times \sin\left(\theta s - \frac{4}{3}\pi\right) \quad (6)$$

In the above equations, Vs is the alternating current voltage peak value of the power supply inverter 4, and θs is the phase of the power supply inverter 4. Since the power supply inverter 4 also determines the level and frequency (phase) of the alternating current voltage within the range of direct current voltage by the PWM control, Vs and θs in the equations (4) through (6) can be arbitrarily controlled.

The voltage adder 5 adds alternating current voltage inputted from the battery inverter 3 and alternating current voltage inputted from the power supply inverter 4. Thus, when the outputs of the voltage adder 5 are Vuo, Vvo and Vwo, the outputs Vuo, Vvo and Vwo are expressed by the following equations (7) through (9).

[Equation 7]

$$Vuo = Vub + Vus = Vu \times \sin\theta b + Vs \times \sin\theta s \quad (7)$$

[Equation 8]

$$Vvo = Vvb + Vvs = Vu \times \sin\left(\theta b - \frac{2}{3}\pi\right) + Vs \times \sin\left(\theta s - \frac{2}{3}\pi\right) \quad (8)$$

[Equation 9]

$$Vwo = Vwb + Vws = Vu \times \sin\left(\theta b - \frac{4}{3}\pi\right) + Vs \times \sin\left(\theta s - \frac{4}{3}\pi\right) \quad (9)$$

In the equations (7) through (9), the voltage from the battery inverter 3 and the voltage from the power supply inverter 4 are added. It is possible, however, to subtract the voltage from the battery inverter 3 or the voltage from the power supply inverter 4 from the other voltage by controlling the phase θb of the battery inverter 3 and the phase θs of the power supply inverter 4.

Each of the alternating current voltages Vuo, Vvo and Vwo determined by the equations (7) through (9) is applied to the alternating current motor 6. The alternating current motor 6 generates torque in accordance with the alternating current voltages Vuo, Vvo and Vwo, and the torque thus produced rotates wheels (not shown) and accelerates an electric vehicle.

At the time of braking, that is, so-called regenerative braking, the alternating current motor 6 functions as an alternative current generator. During this operation, the alternating current motor 6 generates regenerative energy, and supplies this energy to the voltage adder 5 as AC power. At the regenerative braking, the voltage adder 5 executes similar operation to the operation during acceleration, maintaining the relations of the alternating current voltages determined by the equations (7) through (9).

Figure 2:
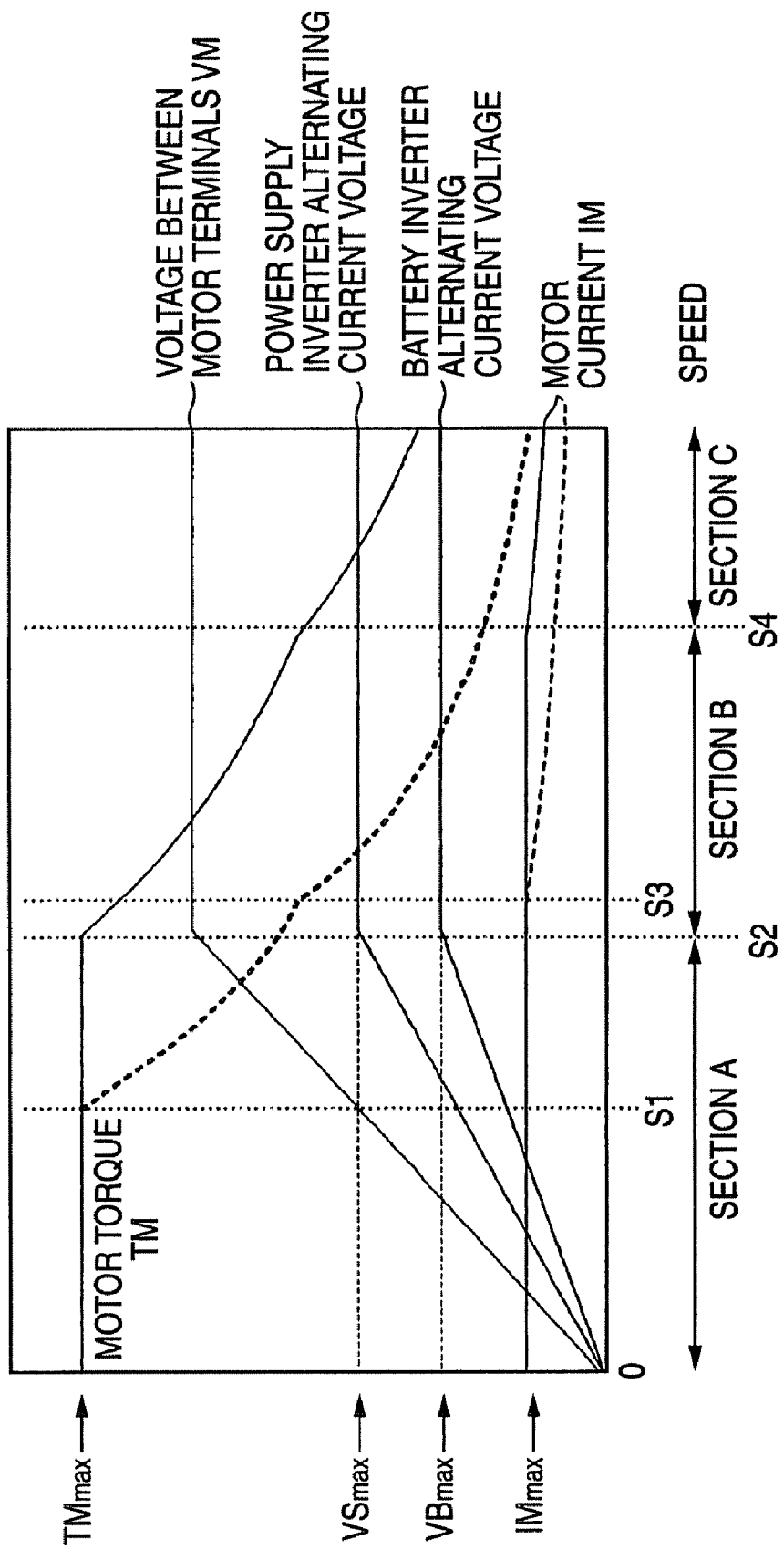
FIG. 2 shows operation of the controller for the variable speed alternating current motor in the first embodiment according to the invention at the time of regenerative braking.

The operation of the electric vehicle at regenerative braking is now discussed. FIG. 2 shows the operation of the controller, clarifying the relations between the vehicle speed and voltage between terminals VM, current IM, and generated torque TM of the alternating current motor 6 at the time of regenerative braking of the electric vehicle. FIG. 2 shows the case in which the alternating current motor operates with the maximum torque and current, indicating the maximum torque and the maximum current of the alternating current motor as TMmax and IMmax, respectively. For comparison, the torque and the current of the alternating current motor not having the battery inverter 3 nor the voltage adder 5 are indicated by dotted lines.

In FIG. 2, a section A is a VVVF (variable voltage variable frequency) range, where the alternating current motor 6 is controlled with the ratio (VM/Finv) of the voltage between terminals VM to the frequency (Finv) kept constant. In this range, the current of the motor IM becomes constant when the torque TM of the motor is kept constant.

The next range is a section B as a constant output range. In the section B as the constant output range, the motor torque TM is decreased in inverse proportion to the speed so that the motor current IM is maintained at the maximum.

According to the related art, this section corresponds to the maximum voltage (VSmax) range where the voltage between motor terminals VM is determined only by the direct current voltage Vc of the power supply inverter 4. In this case, the relation between the maximum alternating current voltage of the power supply inverter 4 VSmax and the direct current voltage Vc of the power supply inverter 4 is determined by the following equation (10).

[Equation 10]

$$Vs\,\max = \frac{\sqrt{6}}{\pi} \times Vc \quad (10)$$

Thus, according to the related art, the section A ends at a speed S1 where the voltage between motor terminals VM reaches the direct current voltage Vc of the power supply inverter 4. After the speed S1, the motor torque TM is decreased in inverse proportion to the speed as shown in FIG. 2.

In this embodiment according to the invention, however, the voltage between motor terminals VM becomes equivalent to the output of the voltage adder 5, i.e., the sum of the alternating current voltage of the power supply inverter 4 and the alternating current voltage of the battery inverter 3 as expressed by the following equation (11).

[Equation 11]

$$Vm = Vs + Vb \tag{11}$$

Thus, the section A which ends at the speed S1 in the related art continues until a speed S2 as shown in FIG. 2, and therefore the torque TM generated by the motor can be improved without increasing the motor current IM by increasing the voltage between motor terminals VM.

After the section A, the section B continues until a speed S3 in the related art, or until a speed S4 in this embodiment, and then a section C as a characteristic range follows. This section C is the maximum performance range determined by the characteristics of the alternating current motor, where the motor torque TM is decreased in inverse proportion to the square of the speed. As a result, the motor current IM decreases in this range as shown in FIG. 2.

In this embodiment according to the invention, the torque generated by the alternating current motor 6 can be improved in the high-speed range after the speed S1 compared with the generated torque in the related art as shown in FIG. 2. Thus, the regenerative braking capability of the electric vehicle in the high-speed range can be enhanced.

The voltage between motor terminals VM is larger than that in the related art in the ranges after the speed S1. However, the motor generally has overvoltage resistance as insulating capacity, and therefore no problem occurs when the voltage between the terminals of the motor is increased within an allowable range for overvoltage resistance.

Accordingly, in the controller for the variable speed alternating current motor according to the first embodiment, the torque TM generated by the motor can be improved without increasing the motor current IM by increasing the voltage between motor terminals VM by the operation of the voltage adder 5. Thus, the regenerative braking capability of the electric vehicle can be enhanced in the high-speed range, eliminating the requirement for supplementary means such as friction brake and other mechanical brake which has low deceleration capacity.

While one power supply inverter 4 and one battery inverter 3 are shown in FIG. 1, the number of these components may be two or larger. In this case, the alternating current side of each of the inverters is connected with the voltage adder 5. In addition, while one alternating current motor is shown in FIG. 1, two or more alternating current motors may be provided. In this case, the alternating current motors are connected with the voltage adder 5.

While improvement of the motor torque at the time of regenerative braking has been discussed in the first embodiment, the motor torque in the high-speed range can be similarly improved at the time of powering.

In regenerative braking, DC power converted from AC power by way of the power supply inverter 4 flows via the pantograph 1b toward the line 1a to be used as power for acceleration of another train in case of electric vehicle, for example. Even when the regenerative power after conversion into DC power by the power supply inverter 4 is not completely consumed by another train due to the operation condition of this train, the regenerative power converted by the battery inverter 3 and inverter 3 and the power supply inverter 4 can be varied by controlling the respective direct current voltage peak values, i.e., Vb and Vs in the equations (1) through (6) by the PWM control of the battery inverter 3 and the power supply inverter 4. Thus, the regenerative energy can be effectively utilized without lowering the regenerative braking capability.

When DC power is accumulated in the energy accumulator 2, the alternating current motor can be actuated only by the AC power converted by the battery inverter 3. Accordingly, equipment such as railroad lines can be eliminated at a vehicle base or other places where high-speed running is not required in case of railroad vehicle, for example, and therefore economical advantages such as considerable reduction in equipment cost can be offered.

The alternating current voltage converted by the battery inverter 3 and the power supply inverter 4 can be varied by controlling the respective alternating current voltage peak values, i.e., Vb and Vs in the equations (1) through (6) by the PWM control of the battery inverter 3 and the power supply inverter 4. It is therefore possible to charge the energy accumulator 2 at the time of stop or powering of the electric vehicle, for example, by combining this control and control over the voltage phases, i.e., θb and θs in the equations (1) through (6) as necessary.

Second Embodiment

Figure 3:
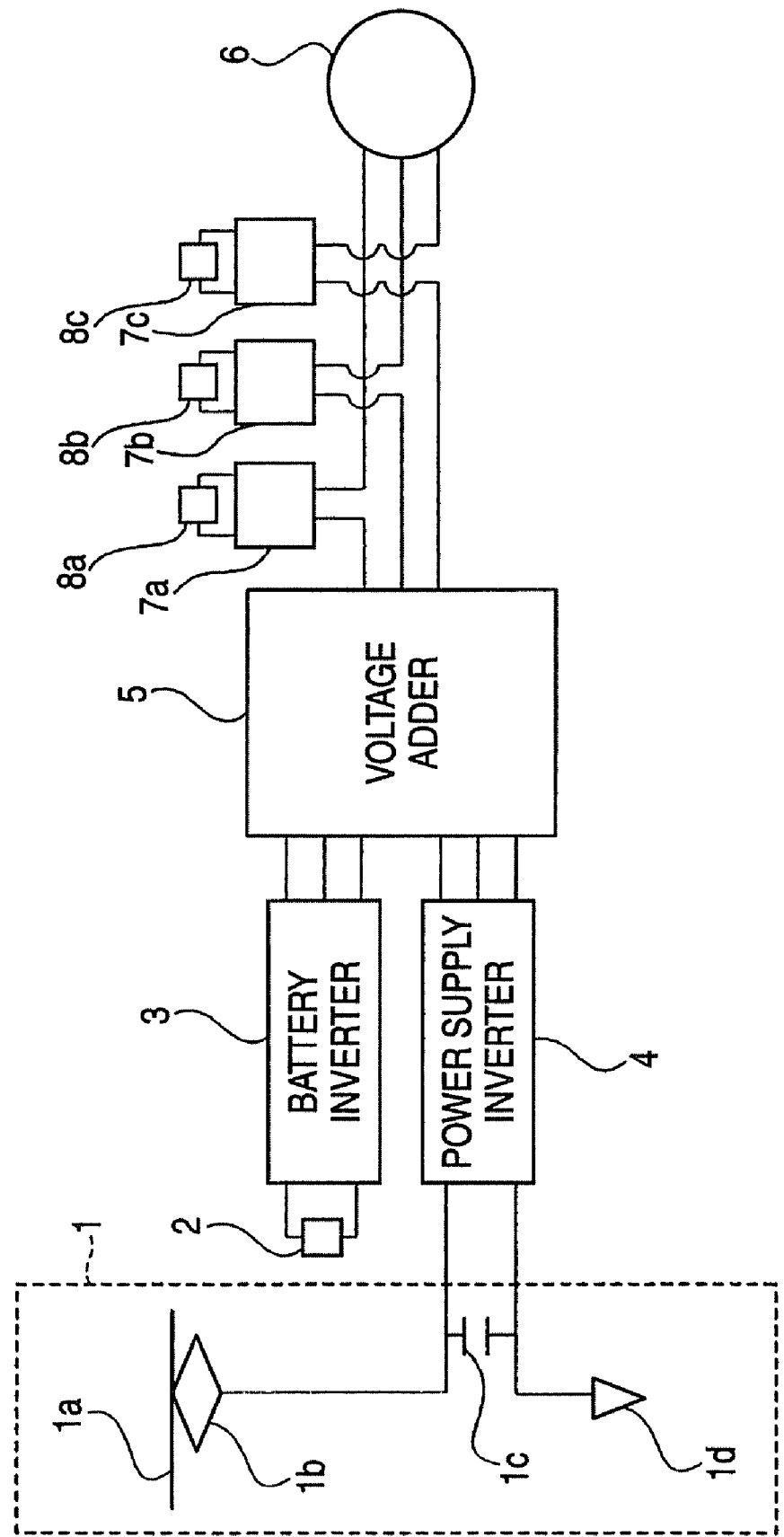
FIG. 3 illustrates a structure of a controller for a variable speed alternating current motor in a second embodiment according to the invention.

FIG. 3 illustrates a structure of a controller for a variable speed alternating current motor in a second embodiment according to the invention. In FIG. 3, components to which the same reference numbers are given are components identical or corresponding to those in the controller for the variable speed alternating current motor according to the first embodiment.

Single phase inverters 7a through 7c shown in FIG. 3 are electric power converters for converting DC power into single phase AC power, or converting single phase AC power into DC power. Energy accumulators 8a through 8c are connected with the single phase inverters 7a through 7c, respectively.

In the first embodiment, a device such as a transformer is used as the voltage adder 5. A typical transformer has an iron core. Since the iron core has a frequency characteristic, the iron core is saturated in a particularly low frequency range and in the case where the magnetic flux determined by the ratio (Vm/Finv) of the level of the voltage between the motor terminals (Vm) to the frequency (Finv) is larger than the rated magnetic flux of the transformer. Thus, in case of electric vehicle, there is a possibility that adding or subtracting executed by the voltage adder 5 cannot be accurately executed when the ratio (Vm/Finv) of the level of the voltage between the motor terminals (Vm) to the frequency (Finv) is required to be large due to the limit to the motor current imposed by the setting of performance, or when the alternating current motor is controlled throughout a frequency range across zero so as to continue operation of the electric brake until stop.

In order to avoid this problem, the single phase inverters 7a through 7c and the energy accumulators 8a through 8b are provided between the voltage adder 5 and the alternating current motor 6 in the second embodiment as illustrated in FIG. 3. Respective alternating current voltages from the single inverters 7a through 7c are added to the voltages Vuo, Vvo and Vwo in the equations (7) through (9) calculated by the voltage adder 5 to increase the voltage applied to the alternating current motor 6.

The operation is now discussed. When the alternating current voltages of the single phase inverters 7a through 7c are Vut, Vvt, Vwt and the single phase inverter alternating current voltage peak value is Vt and the phase of the single phase inverters 7a through 7c is θt, the alternating current voltages Vut, Vvt and Vwt are expressed by the following equations (12) through (14). Since the single phase inverters 7a through 7c determine the level of the alternating current voltage and the frequency (phase) within the range of direct current voltage by the PWM control similarly to the battery inverter 3, Vt and θt in the equations (12) through (14) can be arbitrarily controlled.

[Equation 12]
$$Vut = Vt \times \sin\theta t \quad (12)$$

[Equation 13]
$$Vvt = Vt \times \sin\left(\theta t - \frac{2}{3}\pi\right) \quad (13)$$

[Equation 14]
$$Vwt = Vt \times \sin\left(\theta t - \frac{4}{3}\pi\right) \quad (14)$$

The respective alternating current voltages from the single phase inverters 7a through 7c determined by the equations (12) through (14) have the same frequencies as those of the alternating current voltages shown by the equations (7) through (9) calculated by the voltage adder 5.

According to the structure where the single phase inverters 7a through 7c outputting the alternating current voltages determined by the equations (12) through (14) are provided between the voltage adder 5 and the alternating current motor 6, alternating current voltages Vuo2, Vvo2 and Vwo2 supplied to the alternating current motor 6 can be expressed by the following equations (15) through (17).

[Equation 15]
$$Vuo2 = Vuo + Vut = Vuo + Vt \times \sin\theta t \quad (15)$$

[Equation 16]
$$Vvo2 = Vvo + Vvt = Vvo + Vt \times \sin\left(\theta t - \frac{2}{3}\pi\right) \quad (16)$$

[Equation 17]
$$Vwo2 = Vwo + Vwt = Vwo + Vt \times \sin\left(\theta t - \frac{4}{3}\pi\right) \quad (17)$$

Accordingly, in the structure where the single phase inverters 7a through 7c and the energy accumulators 8a through 8b are provided between the voltage adder 5 and the alternating current motor 6, the alternating current voltage supplied to the alternating current motor 6 can be increased. Thus, the regenerative braking capability in the high-speed range can be enhanced particularly in case of electric vehicle or the like similarly to the case shown in the first embodiment.

When the ratio (Vm/Finv) of the level of the voltage between the motor terminals (Vm) to the frequency (Finv) is required to be large due to the limit to the motor current imposed by the setting of performance, or when the alternating current motor 6 is controlled in a frequency range across zero so as to continue operation of the electric brake until stop, the voltage adder 5 is stopped and only the single phase inverters 7a through 7c are actuated so as to avoid the effect of saturation caused when a transformer or the like is used as the voltage adder 5.

In the case shown in FIG. 3, both the voltage adder 5 and the single inverters 7a through 7c are used. It is possible, however, to eliminate the voltage adder 5 and the battery inverter 3 and actuate only the single phase inverters 7a through 7c since similar advantages to those in the first embodiment are offered.

It is also possible to control charge and discharge of the energy accumulators 8a through 8b connected with the single phase inverters 7a through 7c by controlling the phase θt of the single phase inverters 7a through 7c regardless of the operation condition of the alternating current motor 6. Thus, the controller can be used for reducing voltage fluctuations of railroad lines, lowering regeneration failure of a conventional-type railroad vehicle, leveling current from a substation, or for other applications.

Third Embodiment

A controller for a variable speed alternating current motor according to a third embodiment has select switches 9a and 9b for selecting either the energy accumulator 2 or the external power supply 1 as the direct current power source for the battery inverter 3 in addition to the structure of the controller for the variable speed alternating current motor shown in the first embodiment.

Figure 4:
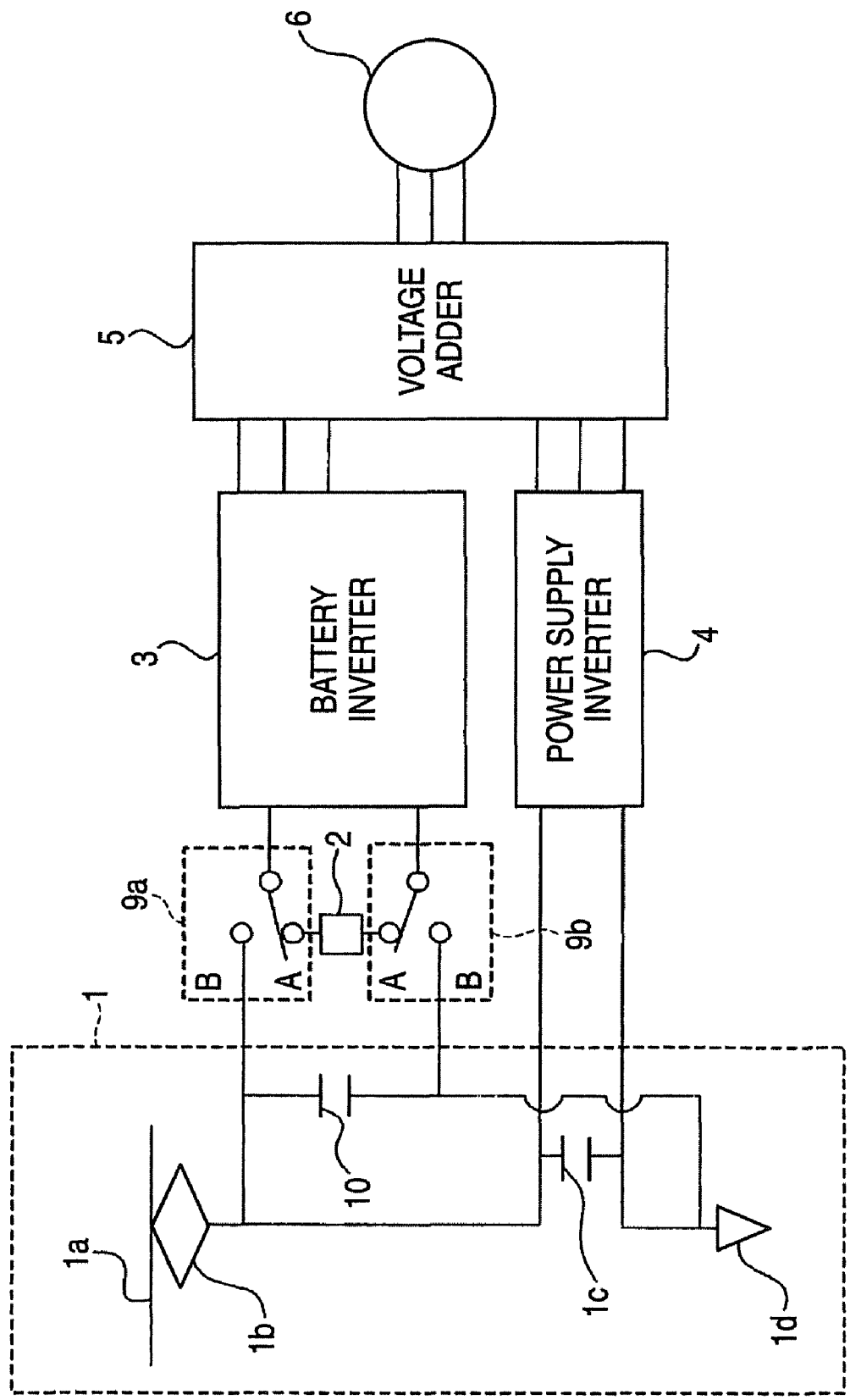
FIG. 4 illustrates a structure of a controller for a variable speed alternating current motor in a third embodiment according to the invention.

FIG. 4 illustrates a structure of the controller for the variable speed alternating current motor in the third embodiment according to the invention. In FIG. 4, the select switches 9a and 9b for selecting either the energy accumulator 2 or the external power supply 1 as the direct current power source for the battery inverter 3, and a filter capacitor 10 are shown. The components to which the same reference numbers are given in FIG. 4 are identical or corresponding to those in the controller for the variable speed alternating motor according to the first embodiment shown in FIG. 1.

When sufficient energy is accumulated in the energy accumulator 2, the select switches 9a and 9b select A side to use the energy accumulator 2 as the power source for the battery inverter 3 as illustrated in FIG. 4.

However, when the energy accumulator 2 is broken or when only a small amount of energy is accumulated in the energy accumulator 2, the select switches 9a and 9b select B side to receive power from the external power supply 1.

In this structure, therefore, the select switches 9a and 9b are set in accordance with the condition of the energy accumulator 2. Thus, the battery inverter 3 can be operated similarly to the operation of the power supply inverter 4 regardless of the condition of the energy accumulator 2.

The invention claimed is:

1. A controller for a variable speed alternating current motor, comprising:
   a first direct current power supply as an external power supply;
   a second direct current power supply as an energy accumulator;
   a first inverter for converting direct current voltage supplied from the first direct current power supply into alternating current voltage;
   a second inverter for converting direct current voltage supplied from the second direct current power supply into alternating current voltage; and
   a voltage adder for receiving respective output voltages from the first and second inverters, adding the received output voltages, and outputting the added voltages to the alternating current motor, wherein the voltage adder is operated such that it increases the voltage between motor terminals without increasing motor current at a time of regenerative operation from the alternating current motor to the first and second inverters.

2. The controller for a variable speed alternating current motor according to claim 1, further including a third inverter to which power is supplied from a third direct current power supply that is connected between the voltage adder and the alternating current motor.

3. The controller for a variable speed alternating current motor according to claim 1, further comprising switching means for selecting the first direct current power supply or the second direct current power supply as the direct current power supply for the second inverter.

4. The controller for a variable speed alternating current motor according to claim 1, wherein the power of the first direct current power supply is received from a line through a pantograph.

5. The controller for a variable speed alternating current motor according to claim 1, wherein the second direct current power supply is a secondary battery or an electrical double layer capacitor.

6. The controller for a variable speed alternating current motor according to claim 1, wherein the voltage adder is configured to subtract the voltage outputted from the first inverter or the voltage outputted from the second inverter from the other of the outputted voltage from the first inverter or the second inverter.

* * * * *